US006622658B2

(12) United States Patent
McPherson et al.

(10) Patent No.: US 6,622,658 B2
(45) Date of Patent: Sep. 23, 2003

(54) ANIMAL LITTER, PROCESS FOR PREPARING ANIMAL LITTER, AND METHOD OF REMOVAL OF ANIMAL WASTE

(75) Inventors: Roger E. McPherson, Muscatine, IA (US); Richard L. Antrim, Solon, IA (US)

(73) Assignee: Grain Processing Corporation, Muscatine, IA (US)

(*) Notice: Subject to any disclaimer, the term of this patent is extended or adjusted under 35 U.S.C. 154(b) by 0 days.

(21) Appl. No.: 10/104,328

(22) Filed: Mar. 22, 2002

(65) Prior Publication Data

US 2002/0134316 A1 Sep. 26, 2002

Related U.S. Application Data

(63) Continuation of application No. 09/725,982, filed on Nov. 29, 2000, now Pat. No. 6,405,677, which is a continuation-in-part of application No. 09/517,244, filed on Mar. 2, 2000, now Pat. No. 6,216,634, which is a continuation of application No. 09/352,445, which is a continuation of application No. PCT/US98/25262, filed on Nov. 25, 1998, now Pat. No. 6,098,569.
(60) Provisional application No. 60/069,387, filed on Dec. 12, 1997.

(51) Int. Cl.$^7$ ................................................. A01K 29/00
(52) U.S. Cl. ....................................................... 119/171
(58) Field of Search ................................. 119/171, 172, 119/173

(56) References Cited

U.S. PATENT DOCUMENTS

| 3,747,564 | A |   | 7/1973  | Bickoff et al. |         |
|-----------|---|---|---------|----------------|---------|
| 3,789,797 | A | * | 2/1974  | Brewer         | 119/173 |
| 3,921,581 | A |   | 11/1975 | Brewer         |         |
| 3,923,005 | A | * | 12/1975 | Fry et al.     | 119/171 |
| 4,009,684 | A |   | 3/1977  | Kliment et al. |         |
| 4,157,696 | A | * | 6/1979  | Carlberg       | 119/172 |
| 4,206,718 | A | * | 6/1980  | Brewer         | 119/171 |
| 4,258,660 | A | * | 3/1981  | Pris et al.    | 119/171 |
| 4,355,593 | A |   | 10/1982 | Stapley        |         |
| 4,374,794 | A | * | 2/1983  | Kok            | 264/122 |
| 4,519,340 | A |   | 5/1985  | Dickey         |         |
| 4,560,527 | A | * | 12/1985 | Harke et al.   | 264/500 |
| 4,676,196 | A | * | 6/1987  | Lojek et al.   | 119/172 |
| 4,770,878 | A |   | 9/1988  | Thomas         |         |
| 4,883,021 | A |   | 11/1989 | Ducharme et al.|         |
| 5,176,107 | A | * | 1/1993  | Buschur        | 119/173 |
| 5,188,064 | A |   | 2/1993  | House          |         |
| 5,193,489 | A |   | 3/1993  | Hardin         |         |
| 5,207,830 | A |   | 5/1993  | Cowan et al.   |         |
| 5,209,185 | A |   | 5/1993  | Chikazawa      |         |
| 5,230,305 | A |   | 7/1993  | House          |         |
| 5,361,719 | A |   | 11/1994 | Kiebke         |         |
| 5,415,131 | A |   | 5/1995  | Dodman         |         |
| 5,526,770 | A |   | 6/1996  | Kiebke         |         |
| 5,605,114 | A |   | 2/1997  | Peltenburg et al. |      |
| 5,664,523 | A | * | 9/1997  | Ochi et al.    | 119/173 |
| 5,690,052 | A |   | 11/1997 | Sladek         |         |
| 5,762,023 | A |   | 6/1998  | Carter         |         |
| 5,878,696 | A |   | 3/1999  | Gerling et al. |         |
| 6,187,581 | B1|   | 2/2001  | Sicotte et al. |         |

FOREIGN PATENT DOCUMENTS

WO    WO 99/30556    6/1999

* cited by examiner

*Primary Examiner*—Yvonne Abbott
(74) *Attorney, Agent, or Firm*—Leydig, Voit & Mayer LTD

(57) ABSTRACT

An animal litter that includes seed meal is disclosed. In accordance with the invention, the animal litter comprises discrete plural particles of a seed meal, which particles tend to agglomerate into clumps when wetted. The litter of the invention absorbs liquids such as animal excretions, and substantially reduces the odor thereof. Preferably, the litter further includes a grain germ, such as corn germ.

11 Claims, No Drawings

ANIMAL LITTER, PROCESS FOR PREPARING ANIMAL LITTER, AND METHOD OF REMOVAL OF ANIMAL WASTE

RELATED APPLICATIONS

This application is a continuation of U.S. patent application Ser. No. 09/725,982, filed Nov. 29, 2000, now U.S. Pat. No. 6,405,677 which was a continuation-in-part of U.S. patent application Ser. No. 09/517,244, filed Mar. 2, 2000, now U.S. Pat. No. 6,216,634, which was a continuation of U.S. patent application Ser. No. 09/352,445 filed Jul. 13, 1999, now U.S. Pat. No. 6,098,569, which in turn was a continuation of International Application No. PCT/US98/25262, filed Nov. 25, 1998, which designates the United States. This application also claims priority to prior Provisional Application No. 60/069,387, filed Dec. 12, 1997. All prior applications are hereby incorporated by reference in their entireties

TECHNICAL FIELD OF THE INVENTION

The present invention relates to a grain-based animal litter, and more particularly relates to an animal litter comprising discrete plural particles which tend to agglomerate upon wetting. The invention further relates to a process for preparing the animal litter, and to related products and processes.

BACKGROUND OF THE INVENTION

Clumping animal litters are those litters which are initially provided in the form of discrete plural particles, which particles tend to agglomerate into solid masses or clumps when wetted by a liquid such as animal urine. A number of such clumping litters have been provided in the prior art. One advantage of such clumping litters is that the solid clumps formed upon wetting of the litter can be separately removed as discrete entities from the remaining litter and can be discarded by the animal owner, leaving behind a quantity of relatively uncontaminated litter. Animal owners, and in particular owners of animals such as house cats, often find the clumping property of such litters to be convenient for periodic cleaning of the animal litterbox. Some known animal litters have good ammonia-masking properties. Because ammonia is a breakdown product of the urea found in animal urine, the ability of an animal litter to mask the odor of ammonia is a desired property.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

Although clay-based litters may be functional as clumping animal litters, such litters suffer from certain drawbacks. For example, one disadvantage of clay litters is the high density of the clay component of the litter. Because of this high density, a heavy mass of litter must be used for a given volume of urine. The resulting clumps of spent litter are somewhat heavy, and thus can fracture in the absence of strong interparticle adhesion. Another disadvantage of clay litters is that, because the clay is not biodegradable, the litter cannot be flushed into some sewerage systems after use. This may be inconvenient for certain animal owners.

In recognition of these drawbacks, the prior art also has provided animal litters made from biodegradable materials, such as seed hulls or other grain-based materials. Such litters are often suitable for disposal by flushing into sewerage systems. In recognition of the advantages inherent in clumping animal litters, the prior art has provided biodegradable litters that exhibit a clumping property. Like typical clumping clay litters, such litters often comprise discrete particles of a liquid-absorbent substrate having a liquid-activated adhesive coated thereon.

Conventional grain-based litters also suffer from a number of drawbacks. For example, spent clumps of such grain-based litters typically are less durable than clumps of clay-based litters. Moreover, conventional grain-based litters also often have a strong odor, which some people find objectionable, and which further may entice animals such as dogs to eat the litter. Moreover, while grain-based clumping litters may initially form cohesive clumps, the long-term cohesiveness of the formed clumps may be poor. Thus, while a solid clump may be formed and remain solid for a short period of time, the clump may tend to disintegrate with time or on handling, making it difficult to separate the spent clumped litter from the litterbox.

Another problem with both clay-based and grain-based clumping litters relates to clumping efficiency, or the amount of litter required to form a clump. Large amounts of conventional litters are required to form a clump, and thus conventional clumping litters are used up quickly. The animal owner thus is forced to replenish the supply of litter frequently.

In light of the drawbacks inherent in known clay-based and grain-based animal litters, there exists a need in the art for a more satisfactory biodegradable clumpable cat litter. Ideally, the litter should be made from a renewable, biodegradable resource, such as a grain-based substrate. The litter should not be edibly attractive to animals, should have a low odor, and should have excellent ammonia masking properties. The litter also should possess acceptable clumping properties, both with respect to initial and long-term cohesiveness of the clumps. It is a general object of the present invention to provide an animal litter that overcomes the drawbacks inherent in known clumping animal litters.

SUMMARY OF THE INVENTION

It has now been found that seed meal, alone or in combination with ground germ or another grain-based substrate, is particularly suitable for use as a clumping animal litter. The present invention is premised on this surprising discovery.

In accordance with one embodiment of the invention, an animal litter is provided. The animal litter comprises discrete plural particles of grain germ and ground seed meal in admixture, the particles tending to agglomerate when wetted. In a preferred embodiment, the litter includes a cohesiveness agent in an amount sufficient to enhance the cohesiveness of the granules. In another embodiment, the invention includes seed meal and a cohesiveness agent. In yet another embodiment, a seed meal is used as animal litter, alone or in combination with other ingredients. Most preferably, the animal litter comprises discrete plural granules of washed grain germ that is spent of oil, seed meal, and a cohesiveness agent in an amount sufficient to enhance the cohesiveness of the granules. The invention further encompasses methods for preparing an animal litter and methods for removing animal waste.

When a litter is made in accordance with the invention, the litter will exhibit an excellent clumping function, such that the granules of litter will agglomerate upon wetting. The clump or clumps formed upon agglomeration of the animal litter will be cohesive, and will remain cohesive for many hours to allow for later removal. Moreover, the litter will be substantially odorless, and will not be edibly attractive to animals such as dogs. The litter will have excellent ammonia-masking properties, and will have a high clumping efficiency.

Other features and embodiments of the invention are disclosed in the following description of the invention and appended claims.

DESCRIPTION OF THE INVENTION

The invention provides a clumping animal litter which agglomerates when wetted by a liquid, such as, for example, liquid animal excretions or liquid that is present in solid or semisolid animal excretions. In accordance with the invention, the litter is provided in the form of discrete plural particles of litter, at least a portion of which particles will agglomerate into at least one clump when wetted. By "agglomerate" is meant formation of a relatively cohesive interparticle consolidation of at least two particles. By "clump" is meant a relatively cohesive consolidated mass, or agglomeration, of two or more particles. It is contemplated that the clumps of animal litter formed in accordance with the invention will comprise an agglomeration of at least two particles, preferably at least about 200 particles, and more preferably at least about 2,000 particles, depending upon the volume of liquid applied.

Generally, the litter of the invention includes a seed meal. Examples of such meals include linseed meal, soy bean meal, sunflower meal, cotton seed meal, rapeseed meal, peanut meal, safflower seed meal, and combinations thereof. By "seed" is meant to include that part of a plant which is capable of forming a new plant upon germination, e.g., whole grains of wheat, including the fruit or fruit-like structure housing the seed. The seed meal comprises spent ground seed, which is seed residue from which oil has been expelled, such as by solvent extraction or expeller extraction. The extracted residue then is ground, by which is contemplated the reduction of the residue to smaller particles, preferably to a semi-course to fine powder. It is contemplated that some seeds will include a hull that may (but need not) be removed prior to expelling oil and grinding. Thus, the meal may comprise a dehulled meal.

The seed meal alone may be used as an animal litter in accordance with the invention. Preferably, however, the litter further includes a grain germ or another grain-based substrate, which substrate may comprise or be derived from any suitable grain. While grains such as wheat, corn, soy, sorghum, alfalfa, and barley, suitable for use in conjunction with the invention, the grain-based substrate preferably is a corn-based substrate. Most preferably, the grain-based substrate is a grain germ, and even more preferably the substrate is corn germ that is obtained in a wet or dry milling process. The grain germ preferably comprises spent germ, which is grain germ from which oil has been expelled, such as by pressing or hexane or other solvent extraction. Most preferably, the grain germ is expeller extracted, that is, the oil has been removed by pressing. Most preferably, the spent germ is substantially free of odor components.

Surprisingly, it has been found that washing of the germ and seed meal, and the germ or other grain-based substrate prior to the incorporation of these ingredients in an animal litter will substantially remove odor components from the substrate. More surprisingly, it has been found that by so removing the odor components, washing will render the litter more acceptable to cat owners and substantially edibly unattractive to animals such as dogs. It is further believed that washing will reduce the level of flavor components in the grain-based substrate.

The litter of the invention is in the form of discrete plural particles. Preferably, the litter includes discrete plural particles of grain germ and seed meal in admixture, generally an intimate blend of the germ or other substrate and the seed meal and any other ingredients. In accordance with a preferred embodiment of the invention, the particles are in the form of compressed or compacted particles, i.e., in the form of granules. By "granules" is meant particles that are compressed or compacted, such as by a pelletizing, extrusion, or similar compacting step. Such compression or compacting of the particles is preferred, inasmuch as the intraparticle cohesion of the particles will be enhanced by such compacting or compressing step. In the preferred embodiment of the invention, the granules are prepared by pelletizing the grain-based substrate in a pellet mill. The pellets prepared thereby are ground or crumbled to a granule size suitable for use as an animal litter. Preferably, the animal litter is in the form of granules having a granule size ranging from about 4 to about 400 mesh (USS); more preferably, about 8 to about 80 mesh; and most preferably about 14 to about 20 mesh. If the seed meal and grain based substrate are spent via solvent extraction, use of a lubricity agent such as corn oil may be necessary in the pelletizer, but such a lubricity agent ordinarily is not necessary if the ingredients are expeller extracted. In other embodiments of the invention, the litter is prepared by other compacting or compressing processes such as, for example, by extrusion of the grain-based substrate through a die and grinding of the extrudate to a suitable granule size.

The granules of grain-based substrate may be sufficiently cohesive for use as an animal litter. Preferably, however, the granules include a cohesiveness agent to enhance the cohesiveness of the animal litter granules. In accordance with the invention, the cohesiveness agent is believed to provide additional hydroxyl groups, which enhance the bonding between grain proteins within the litter granule. It is further believed that the additional hydroxyl groups so function by enhancing the hydrogen bonding of proteins to starch and to other proteins. The cohesiveness agent may be present in any amount suitable to enhance the cohesiveness of the granules of animal litter.

In accordance with the invention, the cohesiveness agent preferably is a polysaccharide. Any suitable polysaccharide may be used in conjunction with the invention and thus, for example, the cohesiveness agent may comprise one or more polysaccharides such as dextrins, maltodextrins, starches, flours, cellulosics, hemicellulosics, and the like. Preferably, the cohesiveness agent comprises a starch, and most preferably, the cohesiveness agent comprises a corn starch.

Prior art litters employ modified, pre-gelatinized starches to effect adhesion between particles of litter, i.e., interparticle adhesion. The starch used in conjunction with the present invention is not used specifically for this purpose, but rather is employed to effect intraparticle cohesion. The clumping interparticle agglomeration of the animal litter of the invention is believed to result primarily as a result of the interaction of proteins or other components present by virtue of the seed meal and/or the grain-based substrate, and is not believed to result from adhesion forces generated through the use of starch. Surprisingly, it has been found that non-gelatinized, unmodified starches are especially suitable for use as cohesiveness agents in conjunction with the invention. When unmodified starches are employed, it is believed that such starches may contribute to a small extent to interparticle adhesion in the clumped litter.

The cohesiveness agent of the invention preferably further includes a supplemental cohesiveness agent. In accordance with the invention, the supplemental cohesiveness agent is an ionic species that is believed to enhance protein—protein and/or protein-starch interactions. Any suitable ionic salt may be used in conjunction with the invention. For example, in accordance with preferred embodiments of the invention, the supplemental cohesiveness agent is selected from among the alkali and alkaline-earth salts of common anions, such as the halide, nitrate, nitrite, carbonate, phosphate, sulfate, and bicarbonate salts, and the like. More preferably, the supplemental cohesiveness agent is selected from the group consisting of sodium chloride, calcium chloride, sodium carbonate, calcium carbonate, sodium bicarbonate and mixtures thereof. Even more preferably, the supplemental cohesiveness agent is selected from among sodium chloride, calcium carbonate, and mixtures thereof. Most preferably, the supplemental cohesiveness agent is sodium chloride. The supplemental cohesiveness agent may be present in any amount sufficient to assist the cohesiveness agent in enhancing the cohesion of the animal litter granules.

The animal litter of the invention may comprise the ground seed alone, or in conjunction with other ingredients. The seed meal is preferably present in am amount of at least about 30% by weight, and more preferably at least about 40% by weight, with a highly preferred range being from about 40% to about 50% by weight when the litter includes a grain-based substrate such as corn germ. In these embodiments the grain germ or other grain-based substrate is present in an amount of at least about 25% by weight (dry basis), more preferably at least about 30% by weight, with a preferred range being from about 40% to about 50%, with the proviso that the total amount of germ or other substrate and seed meal preferably is in the range of about 75% to about 95% of the total weight. When the litter includes primarily seed meal and cohesiveness agent, the ground seed preferably is present in an amount of at least about 55% by weight, more preferably at least about 70% by weight, with a highly preferred range being from about 75% to about 95% by weight.

The remaining dry components of the animal litter preferably include the cohesiveness agent, and, when used, a supplemental cohesiveness agent. The cohesiveness agent may be present in a dry basis amount ranging up to about 45% by weight of the animal litter; preferably, an amount ranging from about 3% to about 35% by weight; more preferably, an amount ranging from about 5% to about 25% by weight and most preferably, inclusive of the supplemental cohesiveness agent. The supplemental cohesiveness agent, when used, is preferably present in an amount of at least about 0.05% be weight, exclusive of the polysaccharide cohesiveness agent. More preferably, the supplemental cohesiveness agent is present in an amount ranging from about 0.05% to about 10% by weight; more preferably, about 0.1% to about 8% by weight; and most preferably, about 1.5% to about 4% by weight. In a preferred embodiment, the supplemental cohesiveness agent is present in an amount of about 2% by weight of litter.

The animal litter preferably consists essentially of seed meal, and, in some embodiments, of seed meal, a grain-based substrate such as a grain germ, and a cohesiveness agent with a supplemental cohesiveness agent. Because such animal litters are made from biodegradable materials, the litter is subject to spoilage, such as by molding. To prevent or inhibit such molding, the litter may include a mold inhibitor, which may be present in any amount sufficient to inhibit the molding of the animal litter. Any suitable mold inhibitor may be employed in conjunction with the invention. The mold inhibitor preferably is selected from among the propionate salts, and most preferably is selected from the group consisting of sodium propionate and calcium propionate. When a mold inhibitor is employed, it preferably is present in an amount ranging from about 0.02% to about 3.5% by weight.

To maintain the cohesiveness and sorption capacity of the animal litter, the litter preferably has a moisture content sufficiently high to prevent the granules of animal litter from becoming friable and sufficiently low to allow additional moisture to be absorbed. Preferably, the moisture content is less than about 30%. More preferably, the moisture content ranges from about 5% to about 25%; even more preferably, the moisture content ranges from about 10% to about 20%; even more preferably, the moisture content ranges from about 12% to about 16%, and most preferably the moisture content is about 14.5%. It is contemplated that some of the moisture in the animal litter will be present originally in the grain-based substrate and/or cohesiveness agent.

In accordance with the invention, the animal litter will be effective in suppressing odors of animal waste. Animal urine contains urea, a compound which breaks down in animal litterboxes to form ammonia. The ammonia odor of animal litterboxes is often considered to be objectionable. Animal litters made in accordance with the preferred embodiments of the invention will be effective in masking ammonia odors, and a litterbox containing such litter will remain free from ammonia odors even after up to about 30 hours after an animal has excreted waste into the litter.

The litter of the invention preferably has a density sufficient to allow interparticle binding, yet that will minimize the weight of litter in a litterbox. In accordance with the invention, the litter preferably has a density ranging from about 15 to about 45 lbs./cu.ft. More preferably, the density of the cat litter of the invention ranges from about 25 to about 40 lbs./cu.ft.; and even more preferably, the density is in the range of from about 30 to about 35 lbs./cu.ft. Density preferably is evaluated after loosely filling a container and measuring the weight of a specific volume of the litter.

Because the animal litter of the invention is to be used to absorb animal waste, the litter should have a sorption capacity sufficient to allow the animal litter to so function. The sorption capacity of the preferred litters of the invention typically is at least about 0.04 ml water per gram of litter, and more typically ranges from about 0.04 to about 2.4 ml/g; more typically, the sorption capacity is from about 1.0 to about 1.4 ml/g. The sorption capacity is determined per gram of animal litter, and is based on the sorption of deionized water, as described in more detail in U.S. Pat. No. 6,098,569. Preferred sorption capacity ranges are believed to approximate that of animal urine.

Other properties may be desired of an animal litter. For example, to minimize inconvenience and mess associated with packaging, transporting, and using the litter, the litter preferably generates a minimal amount of dust. The preferred litters of the present invention do not generate substantial dust. Another preferred property is clumping efficiency. Clumping efficiency is the amount of litter required to form a clump with a given volume of liquid, with lower amounts of required litter corresponding to higher clumping efficiencies. Preferably, to absorb 150 ml animal urine, less than about 120 g of litter is required; more preferably, less than about 110 g is required.

Other desired properties include biodegradability and tendency to remain clumped. Biodegradability is particularly desired when the animal owner wishes to dispose of clumps of litter by flushing them into the toilet. The litter of the invention is believed to be at least as biodegradable as hull-based materials, and thus the litter of the invention may be disposed of by flushing, even into a septic system. Tendency to remain clumped refers to the stability of the clump of clumped cat litter. A clumping litter should remain clumped for at least 48 hours after the clump has formed. The litters of the invention have an excellent tendency to remain clumped.

The invention is also directed towards a process for preparing an animal litter. In accordance with the invention, the process comprises the step of providing discrete plural particles of a seed meal in a particle size suitable for use as an animal litter, as previously described. Preferably, the process includes a step of compacting or compressing the particles of animal litter into granules, which most preferably is accomplished in a pelletizing step. The mold inhibitor and cohesiveness agent, when used, can be added at any suitable time, and preferably are mixed with the seed meal in the desired proportions prior to pelletizing. Moisture content in the pellet mill feed preferably is in the ranges set forth above with respect to the moisture content in the finished product, and preferably is about 14–14.5%. Preferably, moisture is added to the feedstock in the form of liquid water to bring the feedstock to this moisture content. The temperature in the pellet mill preferably is brought to about 82° C. with steam. The pellet mill may be operated under any conditions that impart sufficient work to the feedstock to provide pellets. In one preferred embodiment, the pellet mill is operated with a ⅛ in.×2 in. die at 100 lb./min. pressure at 82° C. to provide pellets, which then are crumbled in a pellet mill crumbler to provide discrete plural particles having a particle size capable of passing through an 8 mesh screen but being retained on a 20 mesh screen.

The process of the invention preferably further includes a step of washing the seed meal and, when used, the germ or other grain-based substrate to substantially remove odor components therefrom. Any suitable washing step can be employed in conjunction with the invention. For example, in accordance with preferred embodiments of the invention, the washing is countercurrent washing. Any suitable washing solvent, such as an aqueous solvent, may be employed in conjunction with the invention. Preferably, the washing solvent is selected from among methanol, ethanol, hydrogen peroxide, water, and mixtures thereof; most preferably, the washing solvent is water.

Also encompassed by the invention is a method for the removal of animal waste. In accordance with the invention, the method comprises the steps of providing a container including the animal litter, allowing the animal to excrete waste into the container, whereby the litter agglomerates into at least one clump, and removing the clump and any solid waste leaving behind substantially unspoiled litter. By "container" is meant any enclosed or partially enclosed area, such as a litterbox, a cage, a stall, a pen (such as a poultry cage), or the like. The method is contemplated to be useful for any animals, such as cats, dogs, mice, birds (especially poultry birds such as turkeys and chickens), gerbils, and other animals, and finds particular applicability in connection with removal of waste from house cats and of poultry waste.

The following examples demonstrate various embodiments of the invention, but should not be construed as limiting the invention in scope.

EXAMPLE 1

Animal Litter

Animal litters were prepared by dry blending the dry ingredients listed in the table below and by extruding the blend through a ⅛ inch×1¾ inch die. The litters were tested for dry product odor and clump weight and shape. Clump weight and shape were determined by insulting the litter with 30 mL water/2 min. delivered from a burette, and subsequently measuring the clump weight and visually evaluating appearance of the clump.

In this table, "B700" is a starch sold by Grain Processing Corporation of Muscatine, Iowa. The various seed meals were obtained commercially.

| Formulary and Test Results | Litter A | Litter B | Litter C | Animal litter of Example 2 of U.S. Pat. No. 6,098,569 |
|---|---|---|---|---|
| Linseed Meal | 78.0% | | | |
| Soy Bean Meal | | 78.0% | | |
| Sunflower Meal | | | 78.0% | |
| Expelled Spent Corn Germ | | | | 78.0% |
| B700 Starch | 20.0% | 20.0% | 20.0% | 20.0% |
| Salt (NaCl) | 2.0% | 2.0% | 2.0% | 2.0% |
| Dry Product Odor | Intermediate | Least | Intermediate | Highest |
| Clump Wt. per 30 mL | 53.8 g | 80.5 g | 73.4 g | 48.9 g |
| Clump Shape | Conical | Conical | Conical | Hemispherical |

Each of the foregoing litters provided excellent properties, including good moisture absorption and clumping properties.

EXAMPLE 2

Animal Litter

Animal litters were prepared and evaluated in accordance with Example 1, except that the litter was formulated with seed meal and corn germ.

| Formulary and Test Results | Litter D | Litter E | Litter F | Litter G | Animal litter of Example 2 of U.S. Pat. No. 6,098,569 |
|---|---|---|---|---|---|
| Linseed Meal | 44.0% | | | | |
| Soy Bean Meal | | 44.0% | | | |
| Sunflower Meal | | | 44.0% | | |
| Cotton Seed Meal | | | | 44.0% | |
| Solvent Extracted Spent Corn Germ | 44.0% | 44.0% | 44.0% | 44.0% | |
| Expelled Spent Corn Germ | | | | | 78.0% |
| B700 Starch | 10.0% | 10.0% | 10.0% | 10.0% | 20.0% |
| Salt (NaCl) | 2.0% | 2.0% | 2.0% | 2.0% | 2.0% |
| Dry Product Odor | Intermediate | Intermediate | Highest | Least | Intermediate |
| Clump Wt. per 30 mL | 57.1 g | 59.0 g | 66.4 g | 63.3 g | 48.9 g |
| Clump Shape | Conical | Conical | Conical | Cylindrical | Hemispherical |

The foregoing litters provided excellent clumping properties.

Thus, it is seen that the present invention has overcome the drawbacks of the prior art. The invention provides a clumpable animal litter in the form of discrete plural particles that agglomerate upon wetting to form a clump. The clumpable litter is biodegradable and, in accordance with preferred embodiments of the invention, has a low odor, a high ammonia masking property, and a high clumping efficiency. Moreover, the clumping properties of the animal litter are at least comparable to those of known litters, and the litter is biodegradable. Spent litter thus may be disposed of by flushing. The litter of the invention remains clumped for at least about 48 hours.

While particular embodiments of the invention have been shown, it will of course be understood that the invention is not limited thereto since modifications may be made by those skilled in the art, particularly in light of the foregoing teachings. For example, it is contemplated that, in lieu of the seed meals, grain-based substrates, and cohesiveness agents disclosed herein, equivalent components may be substituted therefor in an animal litter or associated process. It is, therefore, contemplated by the appended claims to cover any such modifications as incorporate those features which constitute the essential features of these improvements within the true spirit and scope of the invention.

What is claimed is:

1. An animal litter in the form of discrete plural granules, each of said granules comprising crumbled pellets of a pelletized material, each of said granules comprising at least about 50% by weight of a grain-based substrate and further comprising a cohesiveness agent in an amount effective to enhance the cohesiveness of said granules, said cohesiveness agent including a starch, said granules tending to agglomerate when wetted, and said grain-based substrate including grain germ.

2. An animal litter according to claim 1, said grain-based substrate further including seed meal.

3. An animal litter according to claim 1, said litter having a density of from about 25 to about 40-lbs./cu. ft.

4. An animal litter according to claim 1, said litter having a sorption capacity of at least about 1.0 ml/g.

5. An animal litter according to claim 1, said litter having a sorption capacity of from 1.0 to about 1.4 ml/g.

6. An animal litter according to claim 1, wherein less than about 110 g of lifter is required to absorb 150 ml of animal urine.

7. A method for removal of animal waste, comprising:

(a) providing a container including an animal litter, said animal litter being in the form of discrete plural granules, each of said granules comprising crumbled pellets of a pelletized material, each of said granules comprising at least about 50% by weight of a grain-based substrate and further comprising a cohesiveness agent in an amount effective to enhance the cohesiveness of said granules, said cohesiveness agent including a starch, said granules tending to agglomerate when wetted, and said grain-based substrate including grain germ;

(b) allowing an animal to excrete waste into said container, whereby liquid from said waste causes agglomeration of at least a portion of said litter into at least one clump; and (c) removing at least one clump of agglomerated litter from said container.

8. An animal litter according to claim 7, said grain-based substrate further including seed meal.

9. A method according to claim 7, said litter having a density of from about 25 to about 40 lbs./cu. ft.

10. A method according to claim 7, said litter having sorption capacity of at least about 1.0 ml/g.

11. A method according to claim 7, said litter having sorption capacity of 1.0 to about 1.4 ml/g.

* * * * *